United States Patent
Fenske et al.

[19]

[11] Patent Number: 5,887,050
[45] Date of Patent: Mar. 23, 1999

[54] REPEATER APPARATUS HAVING ISOLATION CIRCUIT

[75] Inventors: William J. Fenske, Arlington Heights; Anthony J. Bednaroski, Palatine, both of Ill.

[73] Assignee: Siemens Building Technologies, Inc., Buffalo Grove, Ill.

[21] Appl. No.: 854,280

[22] Filed: May 9, 1997

[51] Int. Cl.⁶ .............................. H04M 1/24; H04M 1/00; H04J 15/00; H04J 14/02

[52] U.S. Cl. .................................. 379/4; 379/2; 379/345; 370/327; 355/127

[58] Field of Search ................................... 379/2, 4, 1, 32, 379/22, 24, 26, 338, 344, 348; 370/264, 315, 327; 359/127, 152, 174; 375/212, 213

[56] References Cited

U.S. PATENT DOCUMENTS

| | | |
|---|---|---|
| 3,758,728 | 9/1973 | Le Roch et al. .............................. 379/4 |
| 4,006,456 | 2/1977 | Wilk . |
| 4,653,070 | 3/1987 | Nakajima et al. . |
| 4,670,886 | 6/1987 | Newcombe, Jr. et al. . |
| 4,710,976 | 12/1987 | Wakabayashi et al. . |
| 4,796,278 | 1/1989 | Naka . |
| 4,837,856 | 6/1989 | Glista, Jr. . |
| 4,939,747 | 7/1990 | Adler . |
| 4,980,887 | 12/1990 | Dively et al. . |
| 5,010,544 | 4/1991 | Chang et al. . |
| 5,109,296 | 4/1992 | Fukushima et al. ........................ 379/4 |
| 5,271,035 | 12/1993 | Cole et al. . |
| 5,282,237 | 1/1994 | Babu et al. ................................. 379/2 |
| 5,390,231 | 2/1995 | Hung et al. ................................. 379/2 |
| 5,422,876 | 6/1995 | Turudic . |
| 5,422,929 | 6/1995 | Hurst et al. . |
| 5,459,714 | 10/1995 | Lo et al. . |
| 5,493,562 | 2/1996 | Lo . |

*Primary Examiner*—Paul Loomis
*Attorney, Agent, or Firm*—Greer, Burns & Crain, Ltd.

[57] ABSTRACT

A repeater apparatus includes a first trunk circuit for receiving and sending data input from and to a first section of the communication link and a second trunk circuit for receiving and sending data input from and to a second section of the communication link. An Isolating circuit is connected to the first trunk circuit for electrically isolating the first section from the second section. For protecting against an overvoltage condition from the communication network, a protection circuit is operatively connected to the first and second trunk circuits. A controller has a first receiver/transmitter circuit for transmitting data from the first trunk circuit to the second trunk circuit, and a second receiver/transmitter circuit for transmitting data from the second trunk circuit to the first trunk circuit. The controller also produces a signal for indicating the completion of data transmission by the first and second receiver/transmitter.

31 Claims, 9 Drawing Sheets

|  | 1 | 2 | 3 | 4 | 5 | 6 | 7 | 8 |
|---|---|---|---|---|---|---|---|---|
| FUNCTION | BIT 0 | BIT 1 | BIT 2 | BIT 3 | BIT 4 | BIT 5 | BIT 6 | BIT 7 |
| NORMAL MODE | OFF | X | X | X | X | X | X | X |
| TEST MODE | ON | X | X | X | X | X | X | X |
| DIP TWITCH | ON | X | X | X | ON | ON | X | X |
| ECHO TEST | ON | X | X | X | ON | OFF | X | X |
| PING PONG | ON | X | X | X | OFF | ON | X | X |
| MASTER | ON | X | X | X | OFF | ON | ON | X |
| REMOTE | ON | X | X | X | OFF | ON | OFF | X |
| 1200 bps | X | ON | ON | ON | X | X | X | X |
| 4800 bps | X | ON | ON | OFF | X | X | X | X |
| 9600 bps | X | ON | OFF | ON | X | X | X | X |
| 19200 bps | X | ON | OFF | OFF | X | X | X | X |
| 38400 bps | X | OFF | ON | ON | X | X | X | X |
| 57600 bps | X | OFF | ON | OFF | X | X | X | X |
| 115200 bps | X | OFF | OFF | ON | X | X | X | X |
| 230400 bps | X | OFF | OFF | OFF | X | X | X | X |

DIP SWITCHES

FIG. 7

REPEATER APPARATUS HAVING ISOLATION CIRCUIT

This invention generally relates to a repeater apparatus for repeating data on a communication network, and more particularly, to a repeater apparatus having a circuit for electrically isolating a link of the communication network, a protection circuit for protecting the link from overvoltage conditions and a controller for performing apparatus self-test operations and a test of the link to which the apparatus is connected.

BACKGROUND OF THE INVENTION

Where a link of a communication network such as a powers multi-drop (PMD) trunk or a local area network (LAN), which are RS 485 communication networks, enters or exits a building or section of a building, it is desirable to electrically isolate the section of the link that leads into the building. This is so that the equipment with which the communication link is connected is protected from transient overvoltage conditions that may develop along that link and cause damage to the equipment. In addition, electrical isolation also provides signal level protection so that undesirable signal distortions or noises produced in the communication network are prevented from propagating into the link that enters the building.

It is known to employ repeater apparatus having opto-isolators for providing electrical isolation and a data driven control circuit for providing data direction control. However, on larger trunk systems, the conventional repeaters typically produce distortions which, when coupled with the distortions from the network, can cause communication errors. In addition, conventional repeaters that have competitively priced components for a control circuit are normally only capable of operating at speeds from about 1200 to 57600 bits per second (bps). The competitively priced control circuits also have a slow turnaround time when switching from a data transmit mode to a receive mode. At higher speeds, these repeaters also are not capable of operating without producing significant errors. The repeaters that operate at higher speeds and that have a fast turnaround time do exist, but they are disadvantageous from a cost perspective.

Other conventional isolators that have overvoltage protection circuits do not meet the new Underwriter's Laboratory (UL) protection requirements for communication wiring that enters a building. Another disadvantage of some of the conventional repeaters is that they are not adapted to conduct troubleshooting measures for themselves or for the communication lines to which they are connected to ensure that data are transferred through the communication lines without errors.

Accordingly, one object of this invention is to provide an improved repeater apparatus for isolating a link of a communication network without producing unacceptable amount of distortions.

Another object is to provide an improved repeater apparatus that utilizes relatively inexpensive components that are capable of transferring data at a high rate of at least 115.2K bps and have a fast turnaround time when switching to a data receive mode.

Yet another object is to provide an improved repeater apparatus which meets the UL overvoltage protection requirements for protecting a communication link that enters into a building.

Still another object is to provide an improved repeater apparatus having self-test capabilities for determining proper operation thereof.

A further object is to provide an improved repeater apparatus for testing the communication line to which it is attached.

Still further object is to provide an improved repeater apparatus incorporating all of the above-desired objects in a single unitary device.

BRIEF DESCRIPTION OF THE SEVERAL VIEWS OF THE DRAWINGS

These and other objects will become apparent upon reading the following detailed description of the present invention, while referring to the attached drawings, in which:

FIG. 7 is a table illustrating the functions of one embodiment of the present invention and corresponding positions of switches of the switching device of FIG. 6;

SUMMARY OF THE INVENTION

Figure 1:
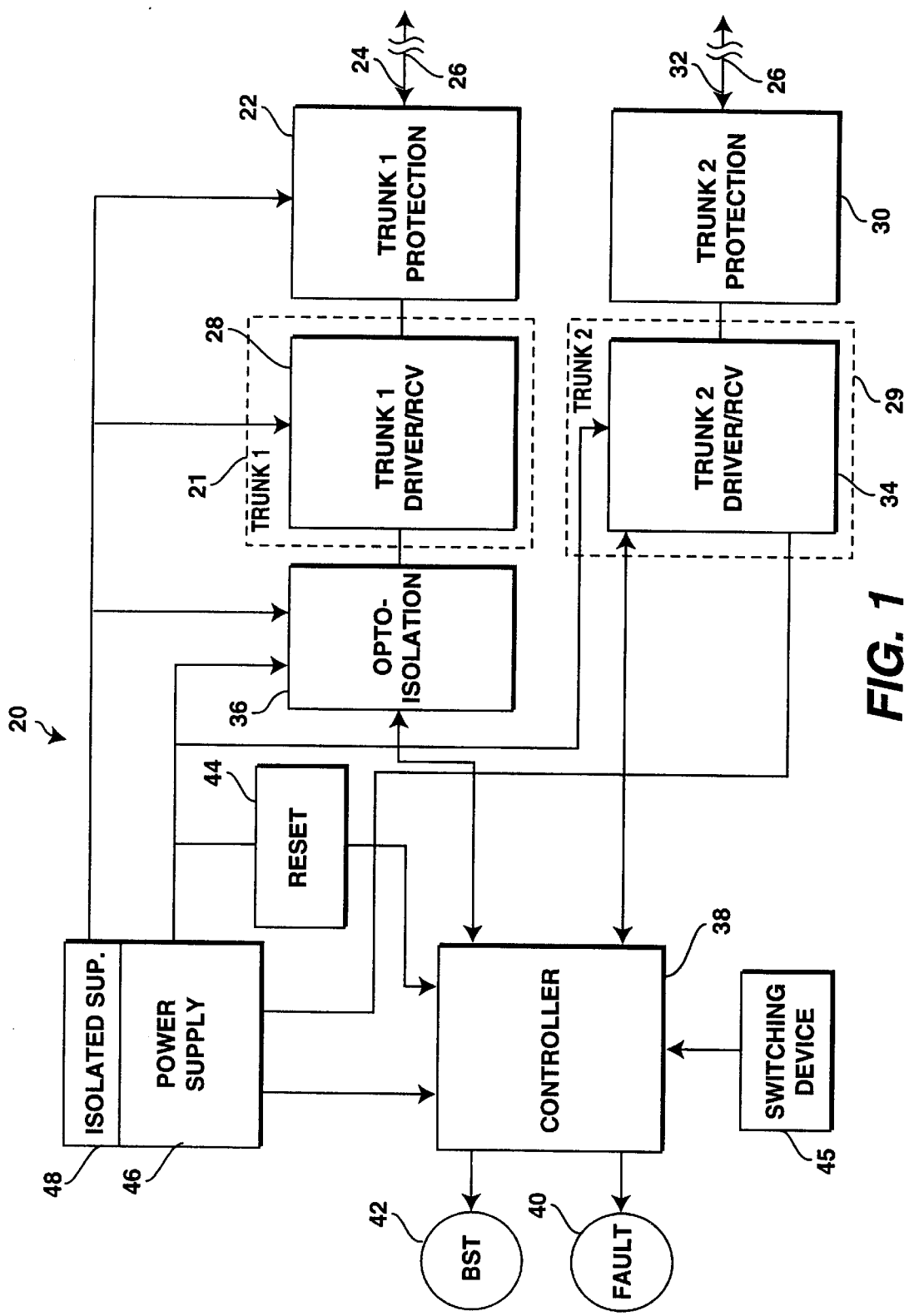
FIG. 1 is a block diagram generally depicting one embodiment of the present invention.

The present invention relates to a repeater apparatus including a circuit for electrically isolating and protecting a link of a communication network that enters a building from overvoltage conditions, which may damage equipment that are connected to the communication network within the building. This invention also transfers data at high rates including 115.2K bps and 230.4K bps. Additionally, the present invention also conducts self-testing and testing of the communication line to which it is attached. The present invention further determines the end of a message and generates an artificial signal to indicate that the transmission of the message is completed from a micro-processor which does not provide this signal. A significant advantage of the present invention is that the components for accomplishing these features are arranged to be a single unitary device.

Broadly stated, the repeater apparatus of the present invention includes a first trunk circuit for receiving and sending data input from and to a first section of the communication link and a second trunk circuit for receiving and sending data input from and to a second section of the communication link. An isolating circuit is connected to the first trunk circuit for electrically isolating the first section from the second section. For protecting against an overvoltage condition from the communication network, a protection circuit is operatively connected to the first and second trunk circuits. A controller transfers data from the first trunk circuit to the second trunk circuit, and from the second trunk circuit to the first trunk circuit.

In another embodiment of the present invention, the controller includes first and second receiver/transmitter circuits, such as a universal asynchronous receiver/transmitters (UART) which receive first data from the first trunk circuit. The controller detects communication errors such as framing errors and overrun errors in the first data, transmits the first data to the second trunk circuit in the absence of detecting communication errors and drops the first data if communication errors are detected. The controller also receives second data from the second trunk circuit, detects communication errors in the second data, transmits the second data to the first trunk circuit in the absence of detecting communication errors and drops the second data if communication errors are detected. Then the controller outputs operation status signals. The controller also produces a transmission completion signal for indicating the end of the first and second data transmitted by the first and second receiver/transmitter circuits, respectively. Also included in this embodiment is a switching device for selecting a transmitting speed of the controller for transmitting the first and second data from a plurality of speeds.

In still another embodiment of the present invention, the switching device switches the repeater apparatus between a normal mode and a test mode, designates the repeater apparatus as a master device or a remote device and selects an operational speed of the repeater apparatus from a plurality of speeds. The controller in this embodiment includes first and second receiver/transmitter circuits. When the switching device sets the repeater apparatus in the normal mode, the controller transfers data from the first trunk circuit to the second trunk circuit and from the second trunk circuit to the first trunk circuit. However, when the repeater apparatus is set in the test mode, the controller determines the operational status of the switching device. In this mode, the controller also generates and transmits test data from a selected one of the first and second receiver/transmitter circuits to the other one of the first and second data receiver/transmitter circuits, and retransmits the test data from the other one of the second data receiver/transmitter circuit to the selected one of the first and second data receiver/transmitter circuit.

Further, the controller also generates and transmits test packets from a particular one of the first and second receiver/transmitter circuits when a repeater apparatus is designated as the master device to a repeater apparatus designated as a remote device. The test packet is received through the same particular one of the first and second data receiver/transmitter circuits from the repeater apparatus designated as the remote device. Based on the test packet received, the master device controller outputs a status message.

DETAILED DESCRIPTION OF THE INVENTION

Turning now to the drawings, and particularly FIG. 1, there is shown a block diagram of one embodiment of a repeater apparatus 20 in accordance with the present invention. The basic configuration of this system includes a first trunk circuit 21 connected to a first trunk protection circuit 22, which is electrically connected to a first section 24 of the communication link 26 on a communication network (not shown) such as the PMD network or the LAN. The first trunk circuit 21 includes a first trunk driver/receiver circuit 28 operatively connected to the first trunk protection circuit 22. A second trunk circuit 29, similar to the first trunk circuit 21, is connected to a second trunk protection circuit 30, which in turn is connected to a second section 32 of the communication link 26. A second trunk driver/receiver circuit 34 is operatively connected to the second trunk protection circuit 30.

The first trunk driver/receiver circuit 28 is operatively connected to an optical isolation circuit 36, which in turn is operatively connected to a controller 38. Unlike the first trunk driver/receiver circuit 28, the second trunk driver/receiver circuit 34 is connected directly to the controller 38. It should be noted that the second trunk driver/receiver circuit 34 may alternatively be connected to the isolation circuit 36 and the first trunk driver/receiver circuit may be connected directly to the controller 38, so that the second trunk driver/receiver circuit 34 is isolated.

Electrically connected to the controller 38, a fault (FAULT) indicator 40 and a basic sanity test (BST) indicator 42 receive signals from the controller 38. Also included in the repeater apparatus 20 and connected to the controller 38 is a reset circuit 44 and a switching device 45. A main power supply unit 46 and an isolated power supply unit 48 supply power to the present repeater apparatus. The isolated power supply unit 48 supplies power to the first trunk circuit 21 and, in part, to the optical isolation circuit 36. Power to the remainder of the repeater apparatus 20 including the second trunk circuit 29, the controller 38, the reset circuit 44 and part of the optical isolation circuit 36 is supplied by the main power supply 46.

In general operation, data received by the first trunk circuit 21 is first fed through the first trunk protection circuit 22 to safeguard against any overvoltage conditions that may arise from the first section 24 of the communication link 26 during the receiving of the data. Then the data is received by the first trunk driver/receiver circuit 28 which functions as a receiver in accordance with the command from the controller 38. The first trunk driver/receiver circuit 28 converts the data from differential RS 485 level signals to HC CMOS level signals and sends the converted signals to the controller 38 via the optical isolation circuit 36 which provides electrical isolation for the first trunk circuit 21 and the first section 24 from the rest of the repeater apparatus 20 and the second section 32 of the link 26.

Specifically, the present invention has two operating modes. The first is a NORMAL mode and the second is a TEST mode, the selection of which is determined by the switching device 45. When the switching device 45 is set to place the repeater apparatus 20 in the NORMAL mode operation, the controller 38 checks the data received through the first trunk circuit 21 for communication errors such as framing errors and overrun errors. If errors are not detected, the data is transmitted out to the second trunk circuit 29. The second trunk driver/receiver circuit 34, which serves as both a receiver and a driver similar to the first trunk driver/receiver circuit 28, now functions as a driver, and sends the data received from the controller 38 to the second section 32 of the communication link 26 via the second trunk protection circuit 30. However, if communication errors are detected, the data having the errors is dropped or deleted from the repeater and is not transmitted to the second communication segment 32. The BST indicator 42 is turned ON and OFF by the controller 38 at a regular interval to indicate to a user that the repeater apparatus 20 is operating normally.

While the operation of the present system has thus been generally described with respect to data being received from the communication link 26 through the first trunk circuit 21, the present invention performs the same functions when data is received through the second trunk circuit 29, with the above-described sequence occurring in the reverse order. In other words, data would be received by the second trunk circuit 29 and transmitted to the first trunk circuit 21 by the controller 38. Accordingly, the second driver/receiver circuit 34 would act as a receiver, and the first driver/receiver circuit 28 would then function as the driver. In any event, regardless of the direction of the data flow, the first trunk circuit 21 and the first section 24 of the communication link 26 are still electrically isolated from the rest of the repeater apparatus 20 and the second section 32.

When the switching device 45 is set to place the repeater apparatus 20 in the TEST mode, the controller 38 conducts various tests including an ECHO test where blocks of test data or packets are sent out through one of the trunk circuits and received by the other trunk circuit, and then sent from the other trunk back to the initial trunk from which the data blocks originated. The returned data blocks are then checked for any communication errors, and if any are detected, the FAULT indicator 40 is turned on for each error detected.

Another type of test, a PING-PONG test, is designed to test the communication link to which the present apparatus is connected. In this test, the repeater apparatus 20 is designated either as a MASTER device or a REMOTE device by the switching device 45. Test data or packets are transmitted from one of the first and second trunk circuits 21, 29 of the repeater apparatus 20 designated as the MASTER device and are received by another repeater apparatus 20 designated as the REMOTE device. In the preferred embodiment, the test packets are transmitted from the first trunk circuit 21. The REMOTE device then retransmits the test packets back to the MASTER device. The MASTER device receives the test packets through the same trunk circuit that they were initially transmitted, and examines the test packets for communication errors. Similar to the ECHO test described above, the FAULT indicator 40 flashes for each error found.

In both the NORMAL mode and the TEST mode the controller 38 monitors two internal universal asynchronous receiver/transmitters (UART) (not shown) included and produces a "transmit complete" (TC) interrupt. Once this signal is received, the UART can be immediately set to receive, if necessary. In this manner, a very fast turnaround time in which the UART becomes a transmitter to a receiver is achieved. It is important to note that a micro-processor employed as controller 38 in the present apparatus 20 is of a type that does not have an inherent function for producing the TC interrupt.

The present invention also performs a switch status test in which the BST and the FAULT indicators 42, 40 are turned ON and OFF to indicate the position of each switch in the switching device 45. More particularly, controller 38 will flash the BST indicator 42 the number of times corresponding to the numerical position of the individual switch in the switching device 45, and if that switch is in the ON position, the FAULT indicator 40 will be turned ON, and if it is in a OFF position, the FAULT indicator 40 will be OFF. This test is conducted for each switch in the switching device 45.

While the foregoing provides a general description of the operation of the system of the present invention, the circuitry of the first and the second trunk circuits 21, 29, the optical isolation circuit 36, the power supply units 46, 48 and the controller 38 including the indicators 40, 42 and the switching device 45 are shown in FIGS. 2–6 and 8 which comprise electrical schematic circuit diagrams for the various components of the system.

Figure 2:
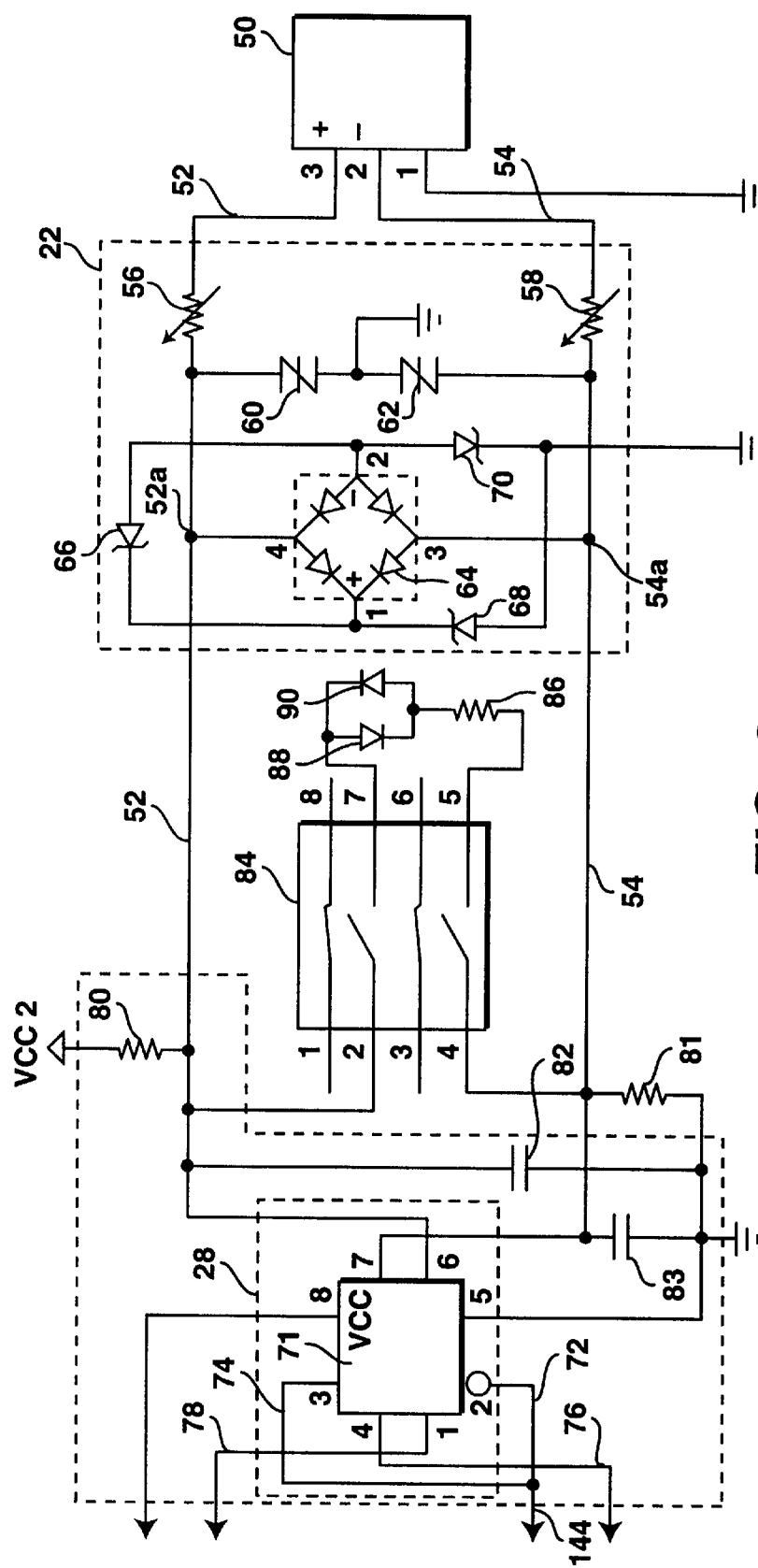
FIG. 2 is an electrical schematic diagram depicting one embodiment of a portion of the present invention and particularly illustrating circuitry for a first trunk.

Turning initially to FIG. 2, the first trunk circuit 21 and the first trunk protection circuit 22 are shown in electrical schematic circuit diagram. Originating from a connector 50, which is electrically connected to the first section 24 of the communication link 26, input/output lines 52, 54 each have a positive temperature coefficient (PTC) devices 56, 58, respectively, included in the first trunk protection circuit 22. The PTC devices 56, 58 are conductive polymer solid state devices which change their conductance with heat. The preferred PTC devices 56, 58 have a maximum operating voltage of 60 V and a maximum interrupt voltage for switching into a high resistance state of 600 V. The resistance range of the PTC devices 56, 58 are from 6.0 ohms to 12.0 ohms. Down stream of the PTC devices 56, 58, two transient surge protectors 60, 62 are coupled to the PTC devices 56, 58. The surge protectors 60, 62 are devices with a clamping voltage of 60 to 95 volts. Once the surge protector reaches the clamping voltage, the surge protectors 60, 62 switch on through a negative resistance region to a low on-state voltage, thereby allowing current to conduct therethrough to a common ground. In the preferred embodiment, the on-state voltage is approximately 1.6 V, and the clamping reaction starts within nano seconds. Conduction continues until the current is interrupted or drops below the minimum holding current of the surge protectors 60, 62. Thus described arrangement of the PTC devices 56, 58 and the surge protectors 60, 62 provides protection from overvoltage conditions which may emanate from the first section 24 of the communication link 26, and also satisfies the UL surge test requirements for UL 1459.

Down stream of the surge protectors 60, 62, a bridge rectifier 64 is connected between nodes 52a, 54a. Across the positive and negative terminals of the bridge rectifier 64, a uni-polar transzorb 66 is connected along with uni-polar transzorb 68 and 70 which are connected between the positive terminal and ground and between the negative terminal and ground, respectively. The bridge rectifier 64 and the transzorbs 66, 68, 70 are provided to meet the UL requirements of UL 864 for normal mode protection.

The input/output lines 52, 54 are further connected to a first driver/receiver interface 71 (for the purposes of simplicity, the input/output lines to the first driver/receiver interface 71 will be denoted as 52 and 54 even though the PTCs 56 and 58 are serially inserted between the connector 50 and the interface 71). The first interface 71 is a high power RS 485 interface chip such a 75176B chip made by Texas Instruments of Dallas, Tex. It is adapted to convert HC CMOS level signals to differential RS 485 level signals when data is transmitted to the communication link 26 and RS 485 level signals to HC CMOS level signals when data is received from the communication link. The first interface 71 is capable of half duplex operation through a receive enable (RE1) line 72, which leads into pin 2 of the first interface 71, and a drive enable (DE1) line 74 which leads into pin 3. When the DE1 line 74 carries a high voltage (VH), data on a drive signal line (TX1) 76 is output on pins 6 and 7 to the input/output lines 52, 54, and when the RE1 line 72 carries a low voltage (VL) to the pin 2, data from the input/output lines 52, 54 is received by a receive line (RX1) line 78.

A pair of bias resistors 80, 81 are used to set the bias voltage, where the bias resistor 80 is connected between the isolated power supply unit (VCC2) 48 and the input/output line 52 and the bias resistor 81 is connected between the input/output line 54 and ground. When the first driver/receiver interface 71 is in a receive state and no data is being received, the bias resistors 80, 81 place the first trunk circuit 21 in a MARKING state or in an idle condition in which the signal level on the input/output lines 52, 54 is a logic 1. Without the bias resistor 80, 81 the state of the first trunk circuit 21 cannot be guaranteed. In other words, the input/output lines 52, 54 may be incorrectly interpreted as being in a SPACING state or having a signal level logic 0, which indicates that data is being received, when, in fact, data is not being received.

Two capacitors 82, 83 are connected between the input/output line 52 and ground and between the input/output line 54 and ground, respectively, to reduce the rise time and electromagnetic interference (EMI) that comes out through the trunk circuit 1. A termination switch 84 connects a termination resistor 86 and two parallel but inverted diodes 88, 90 in series with the resistor 86 across the input/output lines 52, 54 to terminate the signals on the input/output lines 52, 54 when the repeater apparatus 20 is connected at the end of the communication link 26.

Figure 3:
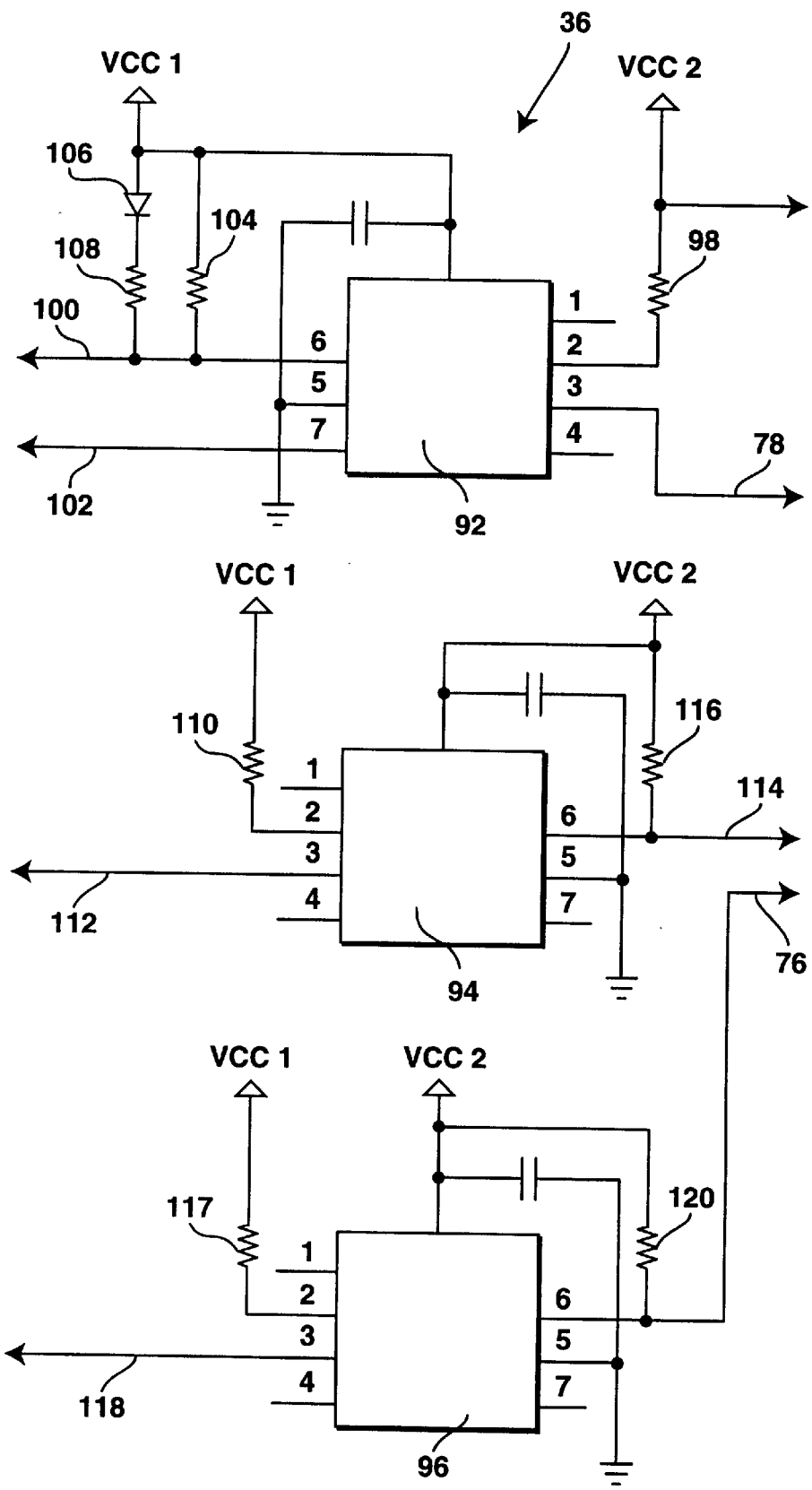
FIG. 3 is an electrical schematic diagram depicting one embodiment of a portion of the present invention and particularly illustrating an optical isolation circuit.

Turning now to the optical isolation circuit 36 in FIG. 3, it includes first, second and third opto-isolators 92, 94, 96, each of the type such as 6N137. The opto-isolators 92, 94, 96 provide signal level electrical isolation for the first section 24 of the communication link 26, which is the portion leading into the building. It should be noted that the opto-isolators 92, 94, 96 are capable of providing over 1500 V of isolation, though this level is not required since, as describe above, the first trunk protection circuit 22 clamps the voltage to the ground level when the voltage reaches approximately 60–90 V. The 1500 V isolation does, however, eliminate transient voltages which reach and appear across the opto-isolators 92, 94, 96 since the opto-isolators are in series parallel combination with the first trunk protection 22.

Turning now to the first opto-isolator 92, its internal input diode (not shown) is connected to pins 2 and 3. The RX1 line 78 from the first driver/receiver interface 71 is connected to pin 3, and a pull-up resistor 98 is connected between pin 2 and the isolated power supply unit (VCC1) 48 to supply the required current to drive the internal input diode. Data received by the RX1 line 78 is output through pin 6 onto a first trunk data receive line (TRK1-RX-DATA) 100, which leads into the controller 38. The control signal necessary for outputting the data received from the RX1 line 78 is sent by the controller 38 on a first trunk receive enable (TRK1-RX-ENA) line 102 connected to pin 7.

A pull-up resistor 104 is connected between the main power supply unit (VCC1) 46 and the output line 100, and provides a voltage source for the open collector output of the opto-isolator 92. Connected parallel to the pull-up resistor 104 is an indicator LED 106 in series with an indicator resistor 106 for providing visual indication of the state of the receive signal line 78. For example, the indicator LED 106 will be on when the trunk circuit 21 is in the SPACING state. The power supply for the first opto-isolator 92 is provided by the main power supply unit (VCC1) 46 to pin 8.

In operation, the output of the first opto-isolator 92 follows the data input from the RX1 line 78. In other words, when the internal input diode of the opto-isolator 92 is turned on, the signal to the TRK1-RX-DATA line 100 via pin 6 of the opto-isolator 92 goes low (VL), and when the input diode is turned off, the output on the pin 6 goes high (VH). It should be noted, however, that the output signal of the opto-isolator 92 follows the data input from the RX1 line 78 only when the TRK1-RX-ENA line 102 from the controller 38 supplies a high signal (VH) to pin 7 of the opto-isolator 92.

Turning now to the second opto-isolator 94, a pull-up resistor 110 is connected between the main power supply unit (VCC1) 46 and pin 2, while a first trunk receive/drive enable (TRK1-RX/TX-ENA) line 112 from the controller 38 is connected to pin 3 to drive the internal diode (not shown) of the second opto-isolator 94. The output of the second opto-isolator 94 appears on pin 6 and is supplied to both the RE1 line 72 and the DE1 line 74 (best seen in FIG. 2) via drive/receive enable relay line 114. A pull-up resistor 116 is connected between the isolated power supply unit (VCC2) 48 and drive/receive enable relay line 114 to provide a voltage source for the output of the second opto-isolator 94. Unlike the first opto-isolator 92, the power supply for the second opto-isolator 94 is provided by the isolated power supply unit (VCC2) 48.

The output of the second opto-isolator 94 via the drive/receive enable relay line 114 and the DEI line 74 and the RE1 line 72 controls the drive/receive function of the first interface 71 as described above. Accordingly, when the output of the opto-isolator 94 is VH, the first interface 71 functions as a driver and drives the data input to pin 4 of the first interface 71 from the third opto-isolator 96 to the first trunk circuit 21, and when the output is VL, the first interface 71 functions as a receiver and transmits the data from the first trunk circuit 21 to pin 3 of the first opto-isolator 92 via pin 1 of the first interface 71. It will be apparent to those skilled in the art that each of the DE1 and RE1 lines 72, 74 can be connected to two separate opto-isolators for the enable signals required for the operation of the first interface 71. By only having one opto-isolator, the manufacturing cost of the repeater apparatus 20 is reduced.

Referring now to the third opto-isolator 96, a pull-up resistor 117 is connected between the main power supply unit (VCC1) 46 and pin 2, while a first trunk data drive line (TRK1-TX-DATA) 118 from the controller 38 is connected to pin 3 to drive the internal diode (not shown) of the third opto-isolator 96. Similar to the second opto-isolator 94, the output of the third opto-isolator 96 appears on pin 6, to which the TX1 line 76 is connected. A pull-up resistor 120 is connected between the isolated power supply unit (VCC2) 48 and TX1 line 76 to act as a voltage source for the output of the third opto-isolator 96. The power supply for the third opto-isolator 96 is also provided by the isolated power supply unit (VCC2) 48. The output of the third opto-isolator is input to pin 4 of the first interface 71 via the TX1 line 76 and is driven out to the first trunk circuit 21 when the second opto-isolator 94 outputs a VH signal to pin 3 of the first interface 71.

Figure 4:
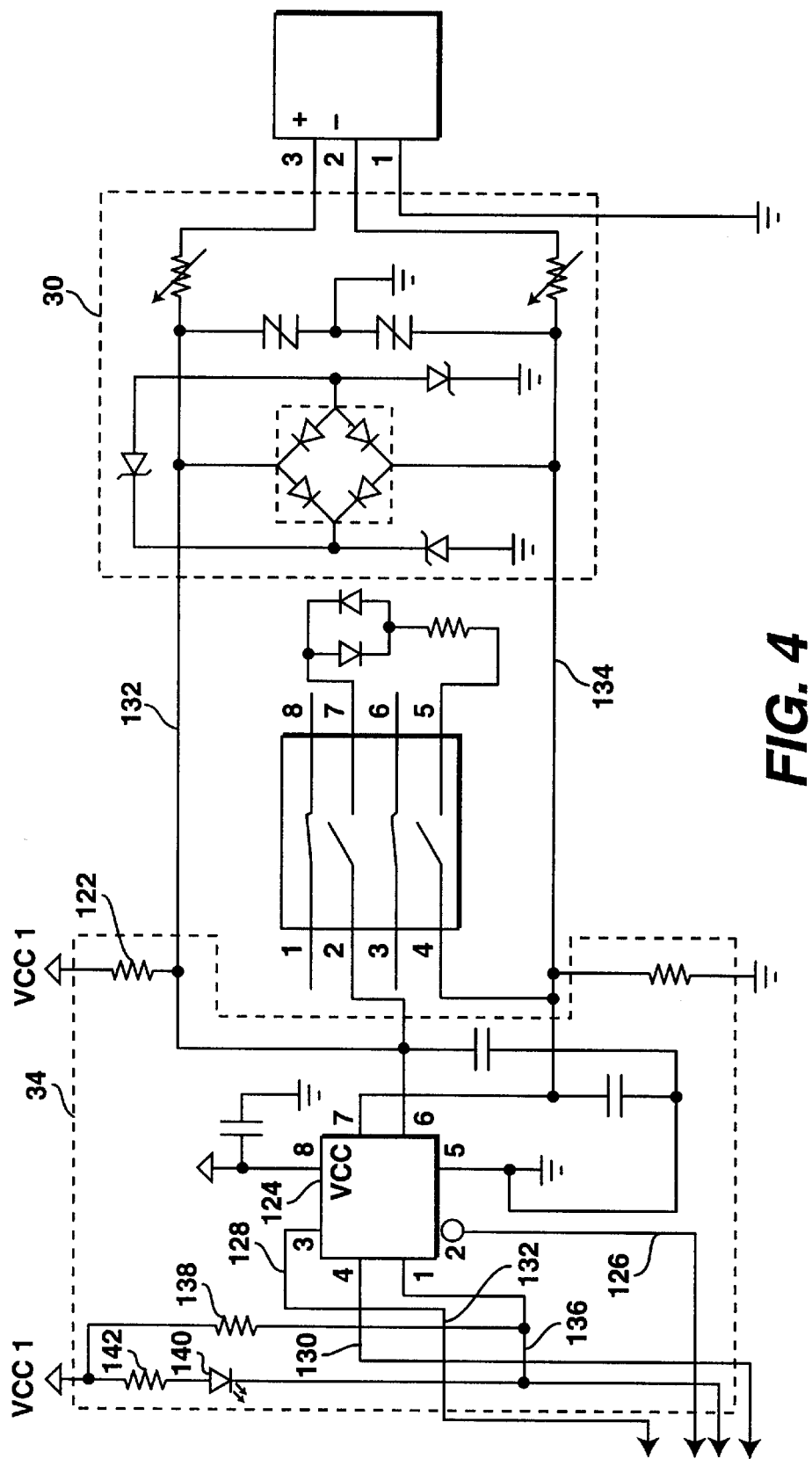
FIG. 4 is an electrical schematic diagram depicting one embodiment of a portion of the present invention and particularly illustrating circuitry for a second trunk.

Referring now to FIG. 4, the second trunk circuit 29 is shown. The second trunk circuit 29 is substantially identical to the first trunk circuit 21 shown in FIG. 2, with the general difference being that the first trunk circuit 21 is operatively connected to the controller 38 through an isolation circuit 36, while the second trunk circuit 29 is operatively connected to the controller 38 directly. As such, only the features of the second circuit that are distinguishable from the circuitry of the first trunk circuit 21 will be described in detail.

One difference is that the power supply to the second trunk circuit 29 via a pull-up resistor 122 and a second driver/receiver interface 124 is provided by the main power supply unit (VCC1) 46 rather than by the isolated power supply unit (VCC2) 48 as in the first trunk circuit 21. The second interface 124, similar to the first interface 71, is also a high power RS 485 interface chip such as a 75176B chip. It is capable of half duplex operation through a second trunk receive enable (TRK2-RX-ENA) line 126, which leads into pin 2 of the second interface 124 from the controller 38, and a second trunk drive enable (TRK2-TX-ENA) line 128 which leads into pin 3 also from the controller 38.

When the TRK2-TX-ENA line 128 supplies a high voltage (VH) to pin 3, data on a second trunk data drive (TRK2-TX-DATA) line 130, which is connected to pin 4, is driven out of pins 7 and 8 to the second trunk input/output lines 132, 134, and when the TRK2-RX-ENA line 126 supplies a low voltage (VL) to the pin 2, data from the second trunk input/output lines 132, 134 is received by a second trunk data receive (TRK2-RX-DATA) line 136, which is connected to pin 1. Pin 1 of the second interface 124 is a tri-state output, which is typical for 75176 type interface, and for this reason, a 10K ohm pull-up resistor 138 is connected between the main power supply unit (VCC1) 46 and the TRK2-RX-DATA line 136. Also connected between the main power supply unit 46 and the TRK2-RX-DATA line 136 is an indicator LED 140 in series with a resistor 142 to provide visual indication of the state of the TRK2-RX-DATA line 136. The LED 140 will be on when the second trunk circuit 29 is in the SPACING state.

Figure 5:
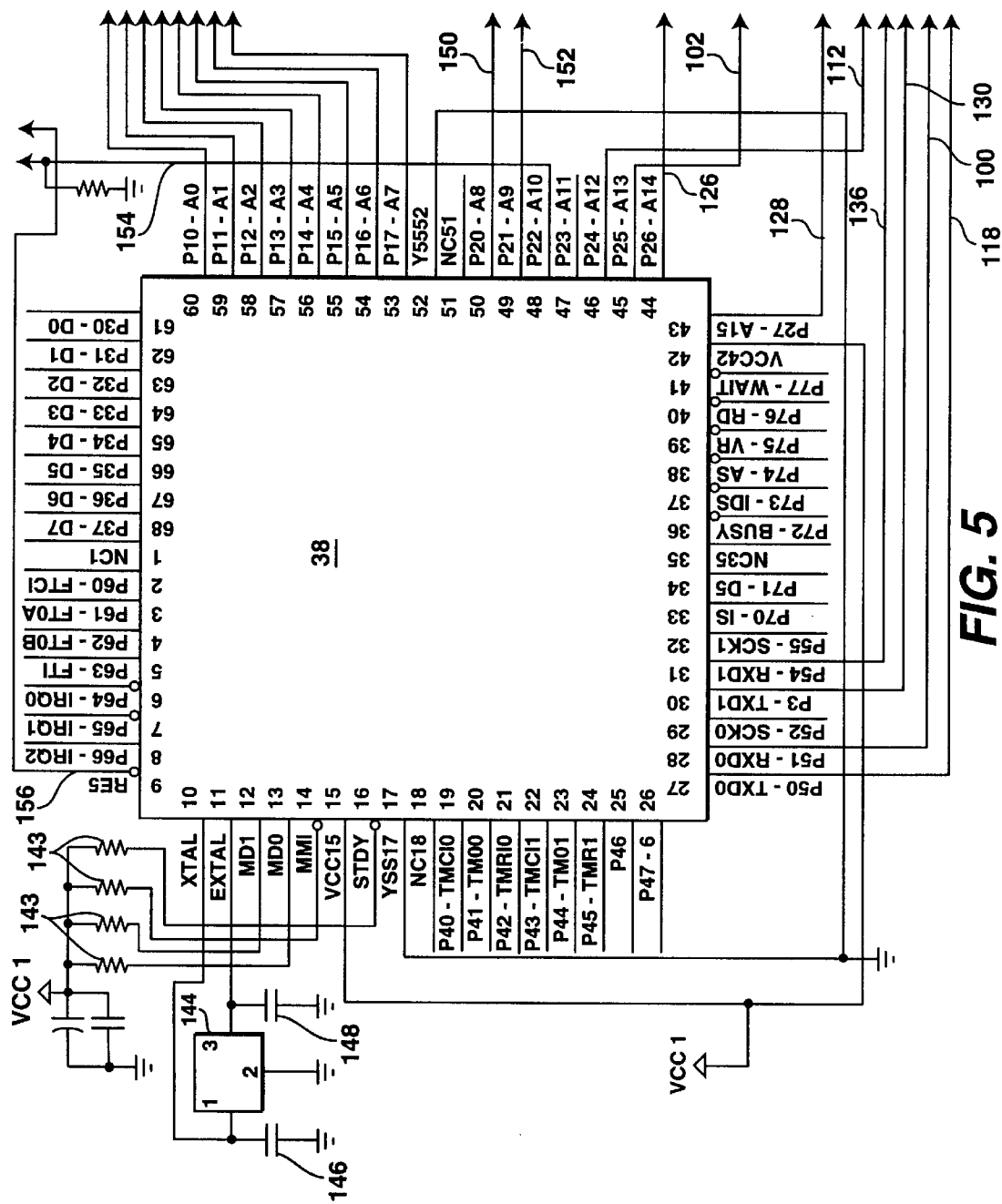
FIG. 5 is an electrical schematic diagram depicting one embodiment of a portion of the present invention and particularly illustrating circuitry for a controlling circuit.

Turning now to the controller 38 as shown in FIG. 5, the controller 38 is a micro-processor, such as a H8/322 micro-processor made by Hitachi of Japan. However, those of ordinary skill in the art will recognize that other suitable micro-processor may be used such as a Motorola HC 11 micro-processor. The controller 38 is an eight bit, dynamic, CMOS micro-processor having a 68 pin PLCC chip configuration with 7 input/output (I/O) ports. The controller 38 communicates at a number of various operating speeds including 115.2K bps and 230.4K bps. A significant feature of the controller 38 is that it contains two UART circuits, each of which has a transmit data register (TDR) and a transmit shift register (TSR) (not shown) for transferring data to and from the first and second trunk circuits 21, 29. Other features (not shown) of the controller 38 include 8K bytes of Read Only Memory (ROM), 256 bytes of Random Access Memory (RAM) and one 16-bit free running timer. In the present invention, the controller 38 is being used in an internal mode, and therefore, the memory for code execution and RAM is mapped to the internal memory of the controller 38 and external memory fetches or control signals are not necessary.

Powered by the main power supply unit (VCC1) 46, the controller 38 is connected thereto via resistors 143. An internal oscillator (not shown) which provides the clock speed for the controller 38 is controlled by an external crystal 144 and two capacitors 146, 148. Preferably, the crystal 144 should be a 14.7456 MHZ, AT-cut parallel resonating device, and the series resistance of the crystal 144 should be between 40 to 60 ohms with a shunt capacitance of 7.0 pF maximum. No external biasing resistor is required for the controller 38. The crystal 144 is connected to pins 10 and 11 of the controller 38.

Referring now to the I/O ports of the controller 38, port 1 includes eight bits corresponding respectively to pins 60 to 53, which are connected to switches 1–8 of the switching device 45 (best seen in FIG. 6), respectively. Switches 1–8 are also connected to ground, and thus, when the switches are in the ON position, the controller 38 reads a zero, and when they are in the OFF position, internal pull-up resistors (not shown) pull the input up to the voltage level of the main power supply unit 46.

Port 2 includes eight bits corresponding respectively to pins 50 to 43, of which bit 3 or pin 47 is unused. Bit 0 or pin 50 is connected to the Basic Sanity Test (BST) indicator 42 via a BST signal line 150, and bit 1 or pin 49 is connected to the FAULT indicator 40 (best seen in FIG. 6) via a FAULT signal line 152. The indicators 40, 42 are adapted to be ON when the controller 38 outputs a zero (0), and OFF when the output is a one (1). Bit 2 or pin 48 is connected to the reset circuit 44 (best seen in FIG. 6) via a controller monitor line 154. The reset circuit 44 is also connected to pin 9 of the controller 38 via a reset (RES) line 156. Bit 4 or pin 46 is connected to TRK1-RX/TX-ENA line 112 that at the other end is connected to the opto-isolator 94 (best seen in FIG. 3) for controlling the receipt and driving of data from and to the first trunk circuit 21. Bit 5 or pin 45 is connected to TRK1-RX-ENA line 102 which at the other end is connected to the first opto-isolator 92 (best seen in FIG. 3) for allowing input data from the first trunk circuit 21 to be received onto the TRK1-RX-DATA line 100. The TRK2-RX-ENA line 126 connects bit 6 or pin 44 of the controller 38 to the second interface 124 to permit the controller 38 to control the input of data from the second trunk circuit 29 to the TRK2-RX-DATA line 136 (best seen in FIG. 4). Lastly, bit 7 of port 2 or pin 43 is connected to the interface 124 via the TRK2-TX-ENA line 128 which carries the signal from the controller 38 for controlling the output of data from the controller 38 onto the second trunk circuit 29 (best seen in FIG. 4).

Ports 3 and 4 which include pins 61 to 68 and 19 to 26 are not used in the present invention. Port 5 includes bits 0 to 5 which correspond respectively to pins 27 to 32. Bit 0 or pin 27 is connected via TRK1-TX-DATA line 118 to the third opto-isolator 96 for transmitting data output by the controller 38 onto the first trunk circuit 21 (best seen in FIG. 3). Bit 1 or pin 28 is connected via the TRK1-RX-DATA line 100 to the first opto-isolator 92 for receiving data input from the first trunk circuit 21 (best seen in FIG. 3). Bit 2 or pin 29 is not used in the present invention. The TRK2-TX-DATA line 130 connects bit 3 or pin 30 to the second interface 124 which transmits data output by the controller 38 onto the second trunk circuit 29 (best seen in FIG. 4). Bit 4 or pin 31 is connected to the TRK2-RX-DATA line 136 which at the other end is connected to the second interface 124 and receives input data from the second circuit 29 (best seen in FIG. 4). Bit 5 or pin 32 is not used in the present invention.

Ports 6 and 7 which include pins 1–8, 33, 34 and 36 to 41 are not used in the preferred embodiment. Pin 35 is also not used. The remaining pins 10 to 17 and 42 of the total 68 pins on the controller 38 are reserved for connection with the main power supply unit 46 via the resistors 143 and the external crystal 144, as specified by the manufacturer.

Figure 6:
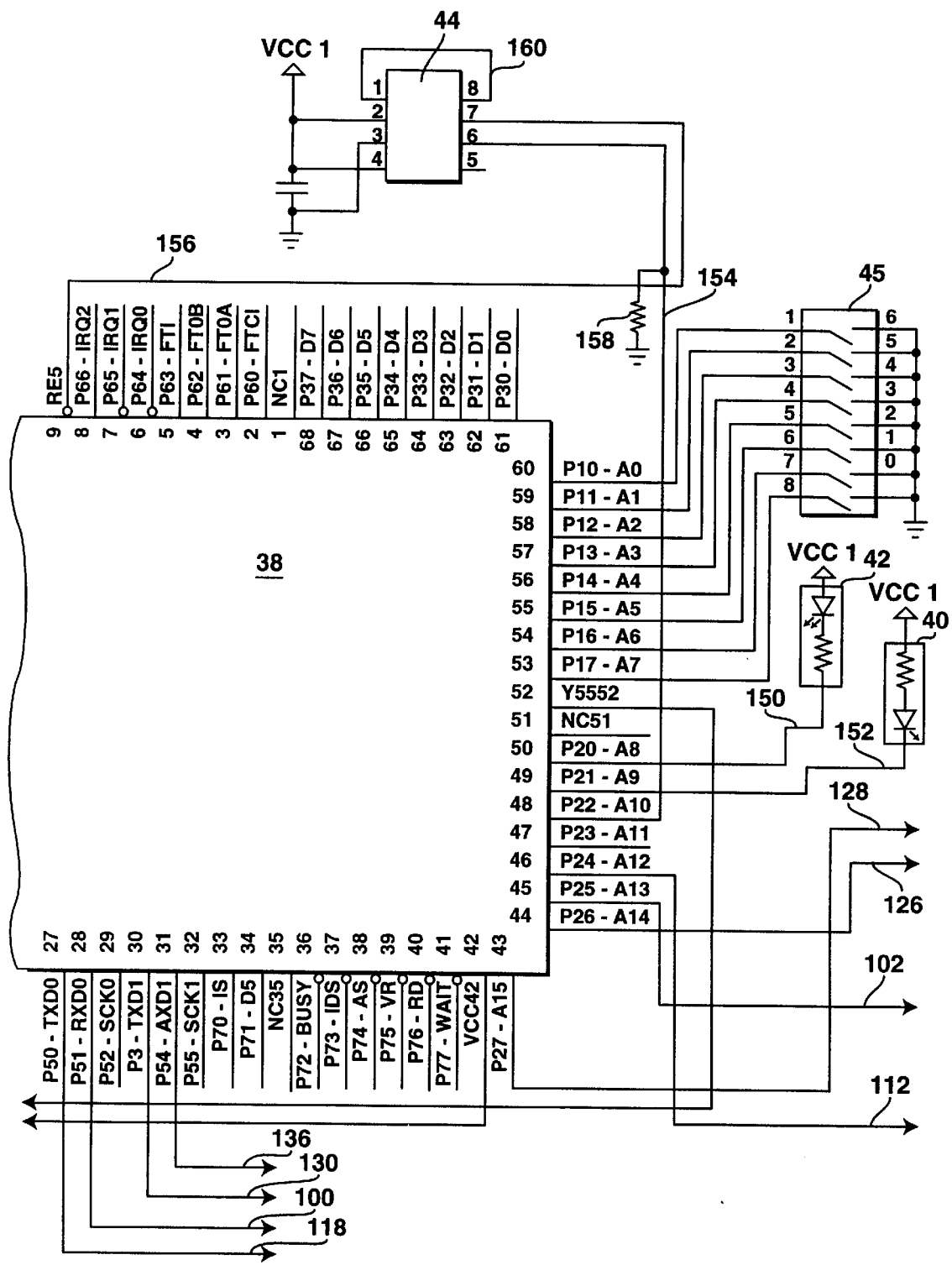
FIG. 6 is an electrical schematic diagram depicting one embodiment of a portion of the present invention and particularly illustrating circuitry for a switching device, a reset circuit, and indicators.

Referring now to FIG. 6, electrical schematic circuit diagram is shown of the FAULT and the BST indicators 40, 42, the switching device 45, the reset circuit 44 and the controller 38 with one side not shown. The FAULT indicator 40 is a LED and it is connected at one end, via the FAULT signal line 152, to port 2, bit 1 or pin 49 of the controller 38 and connected at the other end to the main voltage supply unit 46. The BST indicator 42 is also a LED which is connected at one end, via the BST signal line 150, to port 2, bit 0 or pin 50 of the controller 38 and at the other end to the main power supply unit 46. Each of the indicators 40, 42 are activated or turn ON by a voltage low (VL) signal on the pins to which are they are connected.

Turning now to FIG. 6 and the switching device 45, it includes switches 1–8 which are connected respectively at one end to port 1, bits 0 to 7 or pins 60 to 53 of the controller 38, and at the other end to ground. In the preferred embodiment, the switches are contained in a dual in-line package (DIP) switch, but a person of ordinary skill in the art will recognize that devices other than a DIP switch may be used as the switching device 45, such as fixed pin movable jumpers or wire jumpers. Internal pull-up resistors (not shown) are provided for each bit of port 1, thus placing the bits of port 1 on voltage low (VL) condition when the switches are ON. Switch 1 is used in selecting the operating mode of the controller 38, i.e., the NORMAL or the TEST mode. At power-up, the controller 38 checks the position of switch 1 and if the switch is in the OFF position the controller 38 goes into the NORMAL mode, but if it is in the ON position the controller 38 goes into the TEST mode. Switches 2–4 combined determine the operating speed of the controller 38. The speeds at which the controller 38 is capable of operating and the corresponding positions of switches 2–4 are shown in a table format in FIG. 7. For example, the operating speed of the controller 38 is 115.2K bps when switches 2 and 3 are in the OFF position and switch 4 is in the ON position, and is 230.4K bps when all three switches 2–4 are in the OFF position.

When switch 1 of the switching device 45 is set to the TEST mode, switches 5 and 6 determine the type of test to be run by the controller 38. The present invention is capable of performing three different tests including the switch test, the ECHO test and the PING-PONG test. FIG. 7 shows a table listing these tests and the corresponding positions of switches 5 and 6. For example, the repeater apparatus performs the switch test when both of switches 5 and 6 are in the ON position.

Switches 1, 5–7 are used to designate the repeater apparatus as either the MASTER device or the REMOTE device for conducting the PING-PONG test. When these switches are placed in the ON, OFF, ON and ON positions, respectively, the repeater apparatus is designated as the MASTER device, and switches 1, 5–7 are set to ON, OFF, ON and OFF positions, respectively, the repeater is designated as a REMOTE device. Switch 8 is not used in the present invention.

Turning now to the reset circuit 44, it is a supervisory integrated circuit, which in the preferred embodiment is a Maximum 706, for providing reset timing during power up of the controller 38, voltage monitoring and "watchdog" timing functions. Connected to the controller 38 at port 2, bit 2 or pin 48 via the controller monitor line 154, the reset circuit 44 receives a watchdog input at pin 6 thereof. A resistor 158 is connected between the controller monitor line 154 and ground to provide the lower impedance required to enable the watchdog section (not shown) of the reset circuit 44. The watchdog input is in the form of a pulse output by the controller 38 at least once every 900 ms. A jumper 160 is provided on the reset circuit 44 to connect pin 8 to pin 1, which jumper carries the output of the watchdog section to the reset section (not shown). Connected to pin 7 of the reset circuit 44 is the RES line 156 which is also connected to pin 9 of the controller 38. Through the RES line 156, the reset circuit 44 provides a power-on reset pulse to the controller 38 at power up. The controller 38 is also reset whenever the input power supply from the main power supply unit 46 falls below 4.4 V, and when the watchdog input is not received from the controller 38 at least once every 900 ms.

Figure 8:
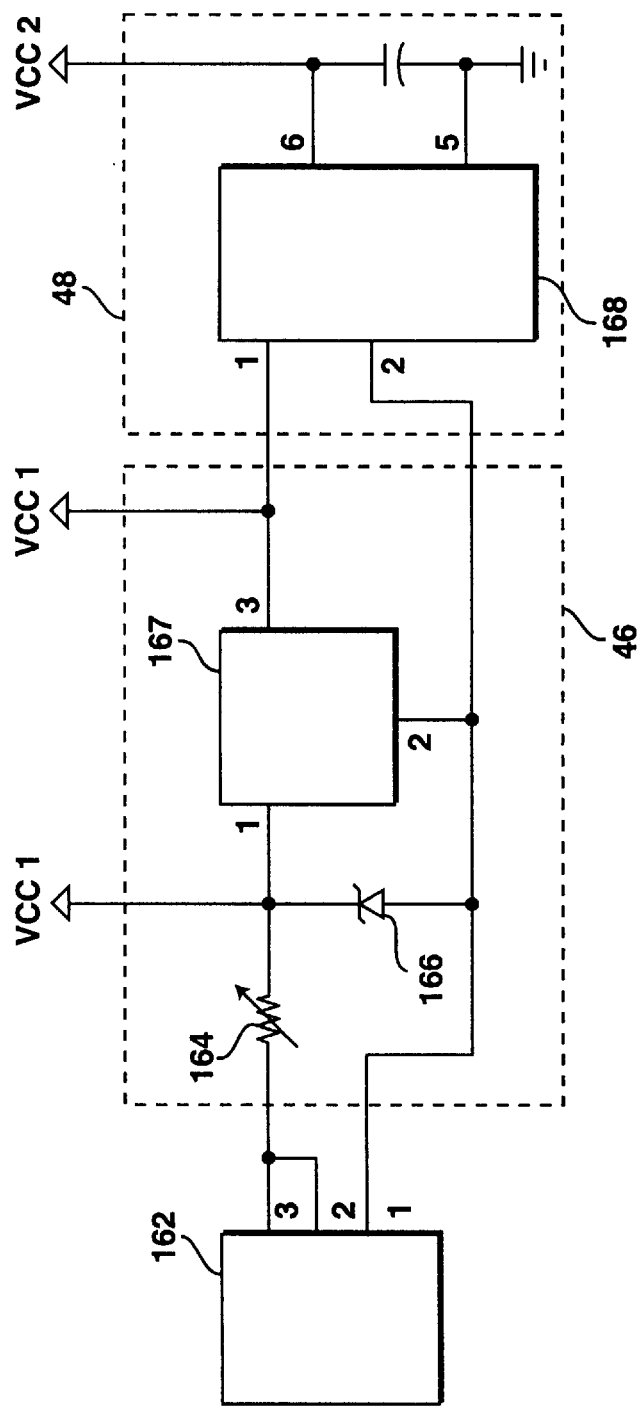
FIG. 8 is an electrical schematic diagram depicting one embodiment of a portion of the present invention and particularly illustrating circuitry for a main power supply unit and an isolated power supply unit.

Turning now to FIG. 8, the electrical schematic circuit diagram of the main power supply unit 46 and the isolated power supply unit 48 are shown. The main power supply unit 46 is an onboard regulator circuit which receives, through a power plug/receptacle 162, an unregulated 6 V dc, 600 mA power supply from an external power pack (not shown) that is readily available off the shelf in, for example, a 120 V, 60 Hz model or a 220 V 50/60 Hz model. The maximum unregulated output from these power packs is approximately 10.5 Vdc at a 132 Vac input.

A series connected PTC device 164 and a 10.5 V transzorb 166 are provided for protecting the power supply units 46, 48 against overvoltage conditions that may emanate from the external power pack. In the preferred embodiment, the PTC device 164 employed is of a type that has a resistance range of about 0.55 to 0.86 ohms prior to switching into the high impedance state and 1.29 ohms after switching. It should hold a current of approximately 400 mA and switch at a maximum current of approximately 800 mA. The maximum time for tripping should be approximately 3.8 seconds at 2000 mA. Once the PTC device 164 switches to the high impedance state, it will stay there until the overvoltage condition has been removed. A PTC device having these specification is optimal for keeping the voltage loss to a minimum and still provide protection for the transzorb 166, which also serves to protect the power supply units 46, 48 and the portions of the repeater apparatus connected thereto, but which cannot withstand the high voltage conditions that the PTC device 164 is capable of enduring. In other words, the PTC device 164 is required to prevent the transzorb 166 from failing while protecting against a overvoltage condition. Also included in the main power supply unit 46 is a voltage regulator 167 for regulating the power supply input from the external power pack (not shown).

Referring now to the isolated power supply unit 48, it is connected to the main power supply unit 64 via a DC/DC converter 168. In the preferred embodiment, the DC/DC converter 168 has an operating frequency of 170K Hz and outputs a ±5 V from a 5 V input received. It should be noted that while the DC/DC converter 168 is unregulated, its output voltage fluctuation is minimal since its input voltage is regulated by the main power supply unit 46. Typically, the output voltage will vary only from 5.7 V for no load to 4.95 V for full load, with the output varying approximately plus or minus 0.5 V from 5 V under normal operating load.

By utilizing the DC/DC converter 168 to isolate the isolated power supply unit 48 from the main power supply unit 46, a single external power pack (not shown) may be used to supply power to the entire repeater apparatus circuit 20, i.e., the isolated unit 48 supplying the isolated first trunk circuit 21 and the main unit 46 supplying the remainder of the apparatus circuit 20. More specifically, the isolated power supply is provided to the input/output line 52, power input pin 8 of the first interface 71, the pull-up resistor 98 which is connected to the internal drive diode of the first opto-isolator 92, the power input pin 8 of the second and third opto-isolators 94, 96, and to the drive/receive enable signal line 114 and drive signal line 76 of the second and third opto-isolators 94, 96, respectively. The locations where the power from the isolated unit 48 is applied is denoted with a designation "VCC2" (best seen in FIGS. 2 and 3). The remaining or the non-isolated portions of the repeater apparatus 20 is supplied by the main power supply unit 46 at the locations denoted with a designation "VCC1" (best seen in FIGS. 3–6). For example, FIG. 4 shows that the power supply from the main unit 46 is connected to the input/output line 132 of the second trunk circuit 29 via the bias resistor 122.

Detailed description will now be made with the controller 38 placed in the NORMAL and the TEST mode operations. In the NORMAL mode, which is established when switch 1 in the switching device 45 is placed in the OFF position as shown in the FIG. 7, data received through the first trunk circuits 21 in the manner described above is received by a corresponding internal universal asynchronous receiver/transmitter (UART1) (not shown) in the controller 38. The controller 38 then checks the data for communication errors, such as framing errors which occur when the stop bit of a data packet is in the wrong state and overrun errors which occur when data bytes are received faster than they can be transmitted by a processor, and passes the data to the other internal universal asynchronous receiver/transmitter (UART2) (not shown) if no error exists. The data is then transmitted from the UART2 to the second trunk circuit 29 in the manner described above. If, however, errors are detected, the controller 38 drops or deletes the data and does not send it to the UART2. In the event of an overrun error, both of the bytes involved in the overrun are dropped.

Each time an error is detected, the controller 38 outputs a signal to the FAULT indicator 40 (a LED), which turns ON for approximately one half second. If another error is detected while the FAULT indicator 40 is ON, the half second timer is reset. The controller 38 also outputs a signal to the BST indicator 42, which is also a LED, to turn the LED ON and OFF at a one second period to inform the user that the controller 38 is operating properly. The rate of speed at which the data is passed through the controller 38 is determined by the switching device 45. For example, at the preferred speed of 230,400 bps, switches 2, 3 and 4 are all set in the OFF position, as shown in the table of FIG. 7.

While a description of NORMAL mode operation has been describe in which data is received from the first trunk circuit 21 and transmitted to the second trunk circuit 29, the present inventions performs this operation in the same manner when data is received from the second trunk circuit 29. When data is received from the second trunk circuit 29, the controller 38 enables the second driver/receiver interface 124 (best seen in FIG. 4) to receive while disabling the first driver/receiver interface 71 (best seen in FIG. 2), and enables the first driver/receiver interface 71 to transmit and disables the second driver/receiver interface 124 when data is transmitted to the first trunk circuit 21. It should also be noted that while the indicators 40, 42 are LEDs in the preferred embodiment, other indicator devices may be used in place of the LEDs such as audible indicators.

To generally place the controller 38 in the TEST mode, switch 1 of the switching device 45 is set to the ON position (best seen in FIG. 7), and to conduct specific tests, i.e., the switch test, the ECHO test or the PING-PONG test, additional switches of the switching device 45 must be set. For the switch test, switches 5 and 6 are also set to the ON position, as shown in FIG. 7. This test is designed to determine the position of each switch in the switching device 45 and display the position to the user through the FAULT and the BST indicators 40, 42. This is accomplished by the controller 38 outputting signals to turn the BST indicator 42 ON and OFF the number of times corresponding to the switch being tested. For example, to determined the position of switch 6, the controller 38 would turn the BST indicator 42 ON and OFF six times. Then a signal would be output by the controller 38 so that the FAULT indicator 40 would turn ON or OFF for a period of ½ second to match the state of the switch position. This process is conducted for all switches and is repeated in a loop until the controller 38 is reset and a different mode of operation is selected.

To perform the ECHO test, switches 1, 5 and 6 of the switching device 45 are set to the ON, ON and OFF positions, respectively. In this procedure, test data is generated by the controller 38 and sent to the second trunk circuit 29 from the first trunk circuit 21 and sent back to the first trunk circuit 21 by the second trunk circuit 29. In the preferred embodiment, the maximum delay period between transmit and receipt of the test data sent by the first trunk circuit 21 is approximately 250 ms. If a response is not received by the first trunk circuit 21 within this time, an error is considered to have occurred and the test is reset. The test is continued by the controller 38 until a different function is selected and the controller 38 is reset. It should be noted that the test data produced by the controller 38 may initially be sent out of the second trunk circuit 29 instead of the first trunk circuit 21. Also, in conducting this test, the user is required to connect a cable between the two trunk circuits 21,29.

The test data generated by the controller 38 is made up at the minimum of 128 bytes of nulls and 128 bytes of hexadecimal FF. It is contemplated that larger blocks of data can also be sent, preferably conforming to the protocol format used on the communication links such as a communication method consisting of a master and one or more remote devices where the master communicates with each remote device on a poll response basis. When the test data is received by the first trunk circuit 21 after having been sent back by the second trunk circuit 29, the controller 38 checks the data for framing errors and determines whether the data received is the same as that which was transmitted. The controller 38 turns ON the FAULT indicator 40 for each error detected. Not affected by this test, the BST indicator continues to turn ON and OFF at one second periods as during the NORMAL mode operation.

Figure 9:
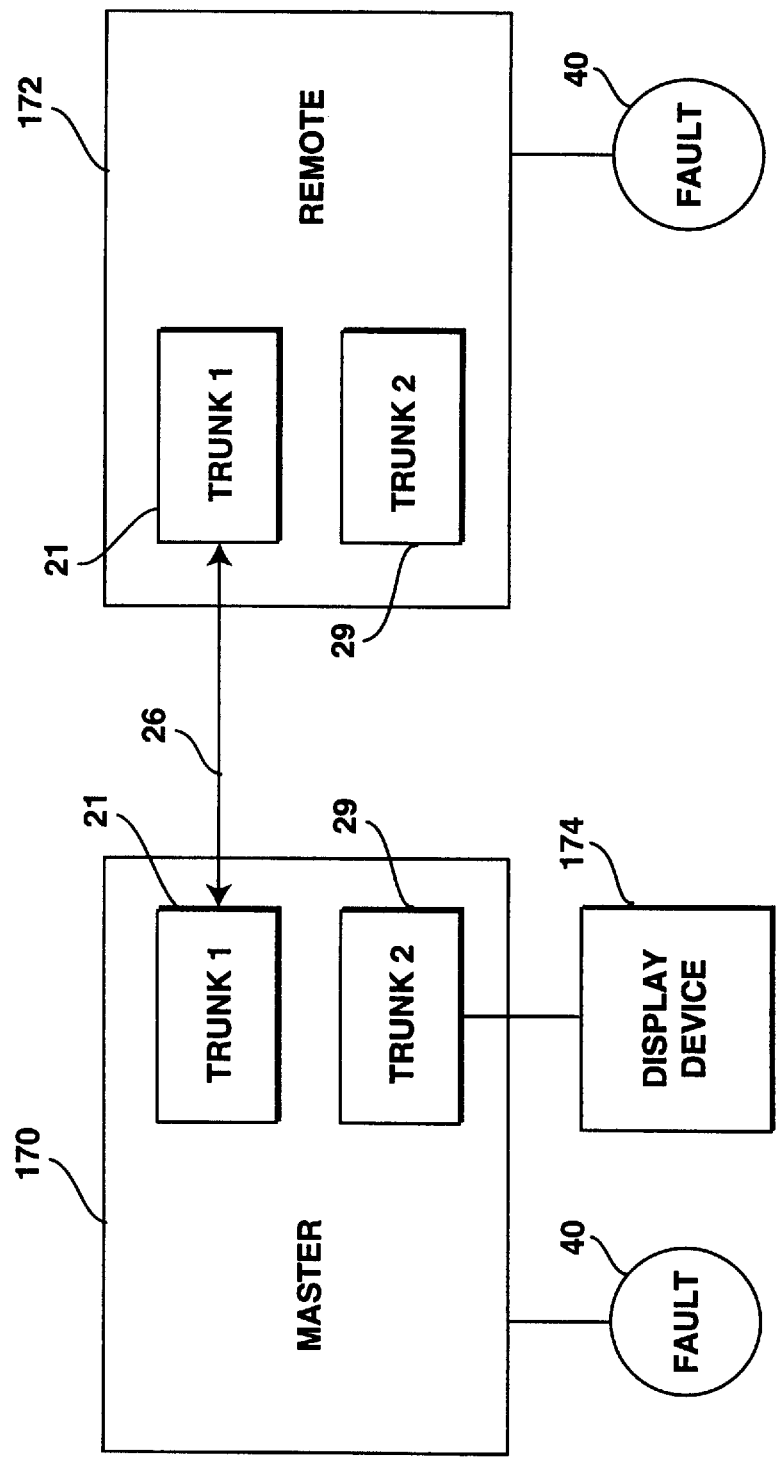
FIG. 9 is a block diagram generally depicting an arrangement for conducting a PING-PONG test in accordance with the present invention.

Referring now to FIG. 9, an arrangement of the repeater apparatus 20 for conducting the PING-PONG test is shown. To conduct the PING-PONG test, switches 1, 5 and 6 of the switching device 45 are set to ON, OFF and ON positions, respectively, as shown in FIG. 7. This test requires that the test data or packets be transmitted between two repeater apparatus. As such, one of the two is designated as a MASTER device 170 and the other as a REMOTE device 172. As shown in FIG. 7, switches 1, 5, 6 and 7 are set to ON, OFF, ON and ON positions, respectively, for the MASTER device 170, and set to ON, OFF, ON and OFF positions, respectively, for the REMOTE device 172. In this manner, test packets from the MASTER device 170 are transmitted from its first trunk circuit 21 to the REMOTE device 172 which receives the test packets through its first trunk circuit 21. The REMOTE device 172 then checks the test packets for message content and communication errors including framing and overrun errors. The REMOTE device 172 then sends the same packets back to the MASTER device, except for the packets containing errors, which are dropped or deleted. The test packets returning from the REMOTE device 172 are received through the first trunk circuit 1 of the MASTER device 170 where packets are again checked for communication errors. The MASTER and REMOTE devices 170, 172 flash their respective FAULT indicator 40 for each byte found to be in error. In this manner, the communication link between the MASTER and the REMOTE devices 170, 172 is tested for errors.

In the preferred embodiment, three different types of test packets are generated and transmitted from the MASTER device 170 in sequence. The first is a 256 byte packet made of Hex FF and 00, the second is a 256 byte packet made of Hex AA and 55, and the third is 256 byte packet which increase from Hex 00 to FC. The test packets are also cyclical redundant check (CRC) protected. Each packet type is sent out 1,000 times before the next type is sent. The rate of speed at which these data packets are transmitted out of the MASTER and the REMOTE devices 170, 172 is established by setting switches 2–4 of the switching device 45 to the positions as shown in the table of FIG. 7. It is contemplated that different test packets may be used for the conducting the PING-PONG test, and that each packet may be sent out more or less than 1,000 times as the user sees fit.

In addition to initiating the test sequence, the MASTER device 170 also keeps count of the number of packets transmitted and received to produce a status message. Included in the status message are the packet number, the type of packet, the number of errors and the rate of errors, which is in the form of errors detected per million bytes of test packets transmitted. The status message is output though the second trunk circuit 29 in ASCII format, preferably at 9600 bps, which is a rate that can be received by a display device 174 such as a computer or a printer which would display the status message to the user.

In the event that the REMOTE device 172 does not recognize the test packets, i.e., no response is received by the MASTER device 170, five more attempts are made to have the REMOTE device 172 respond to the packets. If no response is received even after the fifth attempt, the controller 38 removes the CRC protection from the packets and then resends the modified packets back to the REMOTE device 172. In this manner, the present apparatus 20 can still communicate with a repeater apparatus which do not recognize CRC protected packets. While the operation of the PING-PONG test has been described where the test packets are sent and received though the trunk circuit 1 and the status messages are output through the trunk circuit 2, one of ordinary skill in the art would recognize that the role of the trunk circuits 1, 2 may be reversed.

To obtain a faster turnaround time in which UART is set from a transmitter to a receiver, whether in the NORMAL mode or in the TEST mode, the controller 38 monitors the last character in a data string being transmitted and generates a "transmit complete" (TC) interrupt the moment the last character is transmitted. This is a significant feature of the present invention since the micro-processors that are employed as the controller 38, such as the preferred Hitachi H8/322 and similar processors, do not have an inherent function for producing the TC interrupt.

As disclosed above, these micro-processors consist of the transmit data register (TDR) and the transmit shift register (TSR). In transmitting data, a byte is first loaded into the TDR and then shifted into the TSR before being sent out of the UART. Additional characters or bytes are loaded into the TDR each time a "transmit data register empty" (TDRE) interrupt occurs indicating that the TDR is empty. Conventionally, when the last character of the data being transmitted is loaded into the TDR, the TDRE is disabled and a timer (not shown) is started. The transmission is considered to be completed after the timer reaches the length of time needed for transmitting two bytes of data. In other words, the micro-processor assumes that there are bytes in both the TDR and TSR, even though there may not be a byte in the TSR. As a result, there could be a delay of one byte time before it is known that the transmission is completed.

In the present invention, the TDRE is not disabled until after the last byte in the TDR is transferred to the TSR. At which point, the timer is started, and when the time required for transmitting one byte of data has elapsed, the TC interrupt is generated. This arrangement allows the repeater apparatus 20 to determine the completion of data transmission at the exact moment and not one byte time later, which is often the case in the micro-processors not having this feature of the present invention.

From the forgoing description, it should be understood that an improved repeater apparatus for electrically isolating a link of a communication link has been shown and described, which has many advantages and desirable attributes. For example, the present invention includes the overvoltage protection circuit which meets the UL requirement for repeater apparatus connected to a communication link extending outside a building. Also included is a controller which operates at the speeds including 15.2K bps and 230.4K bps. Further, the present invention also conducts a number of tests including a switch status test for determining the positions of the switches, the ECHO test for conducting a self-test of the controller 38 and the PING-PONG test for determining the integrity of the communication link with which the repeater apparatus is connected. The present invention also has a feature for producing a signal for indicating the completion of data transmission. Another feature of the present invention is that all of the above-described features are incorporated into a single unitary device.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. A repeater apparatus including a circuit for electrically isolating a link of a communication network, comprising:

a first trunk circuit for receiving data input from and driving data to a first section of the link via at least one first communication line;

a second trunk circuit for receiving data input from and driving data to a second section of the link via at least one second communication line;

isolation means, operatively connected to said first trunk circuit for electrically isolating said first trunk circuit from said second trunk circuit;

protection means, operatively connected to said first and said second trunk circuits for protecting against an overvoltage condition from said communication network; and controlling means, operatively connected between said first and second trunk circuits, for transferring data from said first trunk circuit to said second trunk circuit, and from said second trunk circuit to said first trunk circuit.

2. The apparatus as defined in claim 1 wherein each of said first and second trunk circuits includes a driver/receiver interface.

3. The apparatus as defined in claim 2 wherein said driver/receiver interface is an RS 485 interface chip.

4. The apparatus as defined in claim 1 wherein said isolation means includes a plurality of opto-couplers connected between said controlling means and said first trunk circuit for electrically isolating said first trunk circuit from said second trunk circuit.

5. The apparatus as defined in claim 4 wherein a first of said plurality of opto-couplers supplies a receive signal and a drive signal to said first trunk circuit for allowing said first trunk circuit to receive and send data from and to said first section of the communication link.

6. The apparatus as defined in claim 5 wherein a second of said plurality of said opto-couplers receives data input from said first section of the communication link.

7. The apparatus as defined in claim 6 wherein a third of said plurality of said opto-couplers sends data out to said first section of the communication link.

8. The apparatus as defined in claim 1 wherein a first voltage supply to said first trunk circuit is electrically isolated from a second voltage supply to said second trunk circuit.

9. The apparatus as defined in claim 8 wherein a DC/DC converter provides said electrical isolation of said first voltage supply from said second voltage supply.

10. The apparatus as defined in claim 1 wherein said protection means clamps an input voltage from said first and second sections of the communication link to a predetermined voltage when said input voltage reaches said overvoltage condition.

11. The apparatus as defined in claim 10 wherein said protection means includes first protection means, connected between said first trunk circuit and said first section of the communication link, for protecting against a first overvoltage condition from said first section, and second protection means, connected between said second trunk circuit and said second section of the communication link, for protecting against a second overvoltage condition from said second section.

12. The apparatus as defined in claim 11 wherein each of said first and second protection means includes at least one PTC device.

13. The apparatus as defined in claim 11 wherein each of said first and second protection means includes a transient surge protector.

14. The apparatus as defined in claim 11 wherein each of said first and second protection means includes a bridge rectifier and at least one uni-polar transzorb.

15. The apparatus as defined in claim 1 further including a first trunk termination means operatively connected to said first trunk circuit for terminating data transferred from said second trunk circuit, and a second termination means operatively connected to said second trunk circuit for terminating data transferred from said first trunk circuit.

16. A repeater apparatus including a circuit for electrically isolating a link of a communication network, comprising:
    first trunk means for receiving and sending data input from and to a first section of the communication link;
    second trunk means for receiving and sending data input from and to a second section of the communication link;
    isolation means operatively connected to said first trunk means for electrically isolating said first section from said second section;
    protection means operatively connected to said first and second trunk means for protecting against an overvoltage condition from said communication network;
    controlling means, operatively connected between said first and second trunk means and having first and second receiver/transmitter means, for receiving first data from said first trunk means, detecting communication errors in said first data, transmitting said first data to said second trunk means when communication errors are not detected and dropping said first data if communication errors are detected, and for receiving second data from said second trunk means, detecting communication errors in said second data, transmitting said second data to said first trunk means when communication errors are not detected and dropping said second data if communication errors are detected, said controlling means also outputting operational status signals, and producing a transmission completion signal for indicating end of said first and second data transmitted by said first and second receiver/transmitter means, respectively; and
    switching means for selecting a transmitting speed of said controlling means for transmitting said first and second data from a plurality of speeds.

17. The apparatus as defined in claim 16 further including resetting means for resetting said controlling means if said operational status signals are not output by said controlling means within a predetermined time period.

18. The apparatus as defined in claim 16 further including a fault indicator and a normal indicator for indicating a faulty operational condition and a normal operational condition, respectively, based on said operational status signals, said operation status signals indicating absence or presence of communication errors.

19. The apparatus as defined in claim 18 wherein said fault and normal flow indicator are LEDs.

20. The apparatus as defined in claim 16 wherein said plurality of speeds include a speed of 115,200 bit per second and a speed of 230,400 bits per second.

21. A repeater apparatus including a circuit for electrically isolating a link of a communication network, comprising:
    first trunk means for receiving and sending data input from and to a first section of the communication link;
    second trunk means for receiving and sending data input from and to a second section of the communication link;
    isolation means operatively connected to said first trunk means for electrically isolating said first section from said second section;
    switching means for switching the repeater apparatus between a normal mode and a test mode; and
    controlling means, operatively connected between said first and second trunk means and having first and second receiver/transmitter means, for transferring first data from said first trunk means to said second trunk means and for transferring second data from said second trunk means to said first trunk means when the repeater apparatus is set in said normal mode by said switching means, and for conducting a switch position status test, a self-test in which test data is generated and transmitted from a selected one of said first and second receiver/transmitter means to the other one of said first and second data receiver/transmitter means and retransmitted from said other one of said second data receiver/transmitter means to said selected one of said first and second data receiver/transmitter means and is checked for communication errors, and a communication link test in which test data is generated and transmitted from a first repeater apparatus to a second repeater apparatus and retransmitted from said second repeater apparatus to said first repeater apparatus and is checked for communication errors, when the repeater apparatus is set in said test mode.

22. The apparatus as defined in claim 21 wherein said switching means further designates the repeater apparatus as one of said first and second repeater apparatus, and selects an operational speed of the repeater apparatus from a plurality of speeds.

23. The apparatus as defined in claim 21 wherein a time period after said test data is transmitted and to a moment said test data is received by said selected one of said first and second data receiver/transmitter means in said self-test is less than 250 milliseconds.

24. The apparatus as defined in claim 21 wherein said test data is CRC protected.

25. The apparatus as defined in claim 21 wherein said controlling means outputs a fault signal to display means for each byte in said test data found to be in error.

26. The apparatus as defined in claim 25 wherein said display means is a LED.

27. The apparatus as defined in claim 21 wherein a portion of said test data from said second repeater apparatus is not retransmitted back to said first repeater apparatus if a communication error is detected in said portion by said second repeater apparatus.

28. The apparatus as defined in claim 21 wherein said first repeater apparatus determines said second repeater apparatus is the same type as said first repeater apparatus when said test data is accepted by said second repeater apparatus and different from said first repeater when said test data is rejected by said repeater apparatus.

29. The apparatus as defined in claim 28 wherein said first repeater modifies said test data to be acceptable by said second repeater apparatus when said second repeater apparatus is different from said first repeater apparatus.

30. The apparatus as defined in claim 21 wherein said controlling means outputs a status message identifying the type of message contained in said test data generated and transmitted to said second repeater apparatus in said communication link test.

31. The apparatus as defined in claim 21 wherein said controlling means produces a transmission completion signal for indicating end of said first and second data and said test data transmitted by said first and second receiver/transmitter means.

* * * * *